No. 785,350. PATENTED MAR. 21, 1905.
Z. B. CUSTER.
PIPE COUPLING.
APPLICATION FILED JAN. 28, 1904.
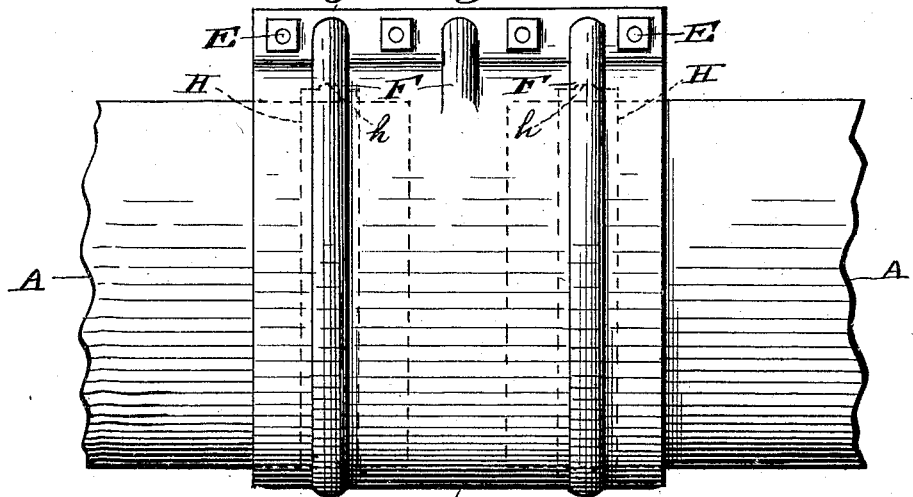
Fig. 1.
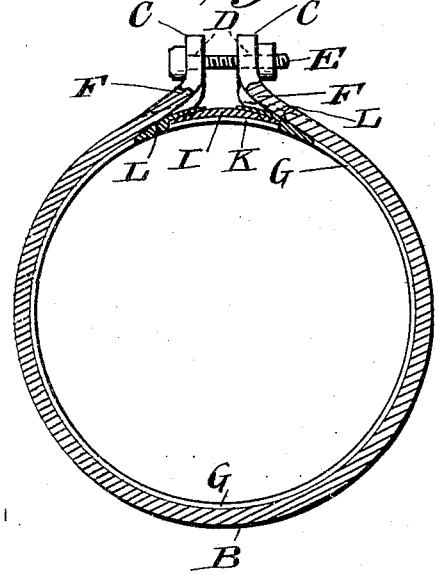
Fig. 2.
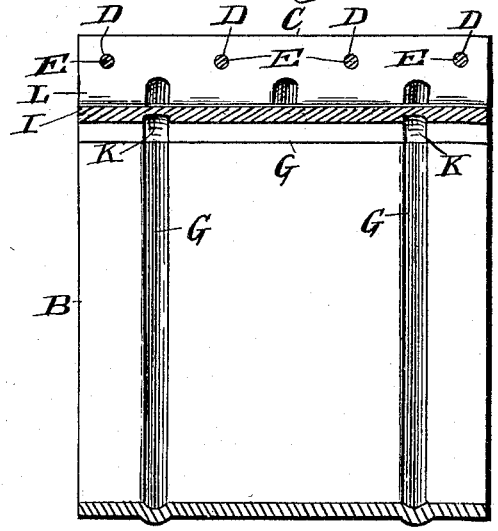
Fig. 3.
Fig. 4.
Witnesses
Inventor
Zora B. Custer No. 785,350.

Patented March 21, 1905.

UNITED STATES PATENT OFFICE.

ZORA B. CUSTER, OF BRADFORD, PENNSYLVANIA.

PIPE-COUPLING.

SPECIFICATION forming part of Letters Patent No. 785,350, dated March 21, 1905.

Application filed January 28, 1904. Serial No. 190,996.

*To all whom it may concern:*

Be it known that I, ZORA B. CUSTER, a citizen of the United States, residing at Bradford, in the county of McKean and State of Pennsylvania, have invented certain new and useful Improvements in Pipe-Couplings, of which the following is a specification.

In the transportation of natural gas and oil it has been found that the ordinary method of joining pipes consisting of screw-threaded sleeves into which the screw-threaded ends of the pipes are secured is not in many cases satisfactory because of the great pressure, which causes a leakage and which, in addition to being expensive, is a nuisance because of the noxious odors and at times becomes a menace because of the danger from fires. There have been a number of couplings made and used that have proved their efficiency by preventing leakage; but in all cases they have cost so much to manufacture that their use has made the transportation of oil and gas very expensive.

The purpose of my invention is to reduce the parts in pipe-couplings to the smallest number, so as to cheapen the cost thereof as well as to simplify the work of attaching the couplings to the ends of the pipes.

The construction and operation of my invention will fully appear hereinafter and by reference to the accompanying drawings, in which—

Figure 1 is a view of the exterior of the coupling, showing it secured to the ends of two pipes; Fig. 2, a cross-section of the coupling; Fig. 3, a view of the coupling in longitudinal section, and Fig. 4 a cross-section of one of the packing-rings.

In the drawings similar reference characters indicate corresponding parts throughout the several views.

A represents the pipes to be coupled; B, the shell of my coupling, which consists of a band of metal of a slightly-flexible character having its ends formed with outwardly-projecting flanges C, provided with holes D to receive bolts E in securing the band in place. In order to brace flanges C, the band is pressed outwardly between the holes D, as shown at F, the braces nearest the sides of the band being connected by depressions G, that when the band is in place form broken rings around the ends of the pipe.

H represents packing-rings to close the joint between the band and the pipes A, having a rib $h$ to fit into depressions G.

I represents a plate to close the joint between the flanges C, having its edges tapered and with strips of soft rubber or other suitable packing material secured thereto by cement or other adhesive substance.

K represents depressions in the plate I, that are in alinement with the depressions G when said plate is in position to receive beads $h$ on packing-rings H. The inner surface of shell B is hollowed out adjacent to the flanged portions C, as shown at L, to receive plate I, so that when the coupling is in position its inner surface and the lower surface of the plate I form a perfect cylinder.

In practice I have found it to be the best plan to cement or otherwise secure the packing-rings H to the ends of the pipes before securing the shell B in position, as there is then no danger of leakage because of inequalities in the surface of the pipes and a more stable joint insured.

Having thus described my invention, what I claim is—

1. In a pipe-coupling, a shell or casing made of a single piece of sheet metal, the meeting edges of said shell turned outwardly to form flanges having registering holes therein, the flanges braced by pressing the metal outwardly between said holes, a plate to cover the opening between the ends of the shell, packing-strips secured to the edges of said plate, and means to secure said flanges together, substantially as shown and described.

2. In a pipe-coupling, in combination with the meeting ends of two pipes, packing-rings secured thereto, a shell or casing made of a single piece of sheet metal, the meeting ends of said shell turned outwardly to form flanges having registering holes therein, the flanges braced by pressing the metal outwardly between said holes, depressions formed on the inside of the shell to receive said packing-rings, and means to secure said flanges together, substantially as shown and described.

3. In a pipe-coupling, in combination with the meeting ends of two pipes, packing-rings secured thereto, a shell or casing made of a single piece of sheet metal, the meeting ends of said shell turned outwardly to form flanges having registering holes therein, the flanges braced by pressing the metal outwardly between said holes, a plate to cover the opening between said flanges, depressions in said shell and plate to receive said rings, and means to secure said flanges together, substantially as shown and described.

4. In a pipe-coupling, in combination with the meeting ends of two pipes, packing-rings secured thereto, a shell or casing made of a single piece of sheet metal, the meeting ends of said shell turned outwardly to form flanges having registering holes therein, the flanges braced by pressing the metal outwardly between said holes, a plate to cover the opening between said flanges, packing-strips secured to the edges of said plate, depressions in said shell and plate to receive said rings, and means to secure said flanges together, substantially as shown and described.

5. In a pipe-coupling, in combination with the meeting ends of two pipes, packing-rings secured thereto, having beads on their outer surface, a shell or casing made of a single piece of sheet metal, the meeting ends of said shell turned outwardly to form flanges having registering holes therein, the flanges braced by pressing the metal outwardly between said holes, a plate to cover the opening between said flanges, packing-strips secured to the edges of said plate, depressions in said shell and plate to receive the beads on said rings, and bolts to secure said flanges together, substantially as shown and described.

In testimony whereof I hereto affix my signature in the presence of two witnesses.

ZORA B. CUSTER.

Witnesses:
  W. E. BURDICK,
  M. E. JACKSON.